United States Patent [19]

Tolle

[11] 4,239,250
[45] Dec. 16, 1980

[54] HITCH POSITIONING MECHANISM

[76] Inventor: Russell W. Tolle, P.O. Box 261, Chanute, Kans. 66720

[21] Appl. No.: 17,347

[22] Filed: Mar. 5, 1979

[51] Int. Cl.³ .............................................. B60D 1/14
[52] U.S. Cl. ................................ 280/446 B; 280/402; 414/563
[58] Field of Search ............... 280/402, 446 R, 446 B, 280/448, 460 R, 483, 484, 486, 488, 491 R, 491 C, 492, 493; 414/563

[56] References Cited
U.S. PATENT DOCUMENTS

| 1,435,063 | 11/1922 | Holmes | 280/482 |
| 2,541,582 | 2/1951 | Hawkins | 280/402 |
| 2,585,768 | 2/1952 | Ham | 280/487 |
| 2,796,183 | 6/1957 | Cline et al. | 280/446 B |
| 2,913,131 | 11/1959 | Holmes | 280/446 B |
| 3,000,652 | 9/1961 | Hawkins | 280/406 R |
| 3,504,811 | 4/1970 | Wegener et al. | 280/480 |
| 3,796,443 | 3/1974 | Crutchfield | 280/446 B |
| 3,806,162 | 4/1974 | Milner | 280/491 R |
| 4,022,489 | 5/1977 | Shattles et al. | 280/491 E |

Primary Examiner—John J. Love
Assistant Examiner—Donn McGiehan
Attorney, Agent, or Firm—Fishburn, Gold and Litman

[57] ABSTRACT

A deformable hitch for towing vehicles having a mechanism thereon for positively urging the hitch into a desired orientation, such that the hitch bottom bar which is connected to a towing vehicle by two arms is urged to remain in a desired position parallel to the rear of the towing vehicle. The mechanism comprises two tensile members and a lever member. The lever member is attached to the bottom bar and extends outwardly therefrom. The tensile members are each attached respectively to a medial point along one of the arms of the hitch and to the lever member, such that the tension on each of the tensile members is equal whenever the bottom bar is in the desired parallel position and thus the hitch is in a state of equilibrium. In addition, the tension on each of the tensile members is different whenever the bottom bar is in a position other than the desired parallel position, thereby urging the bottom bar to return to the desired parallel position.

6 Claims, 5 Drawing Figures

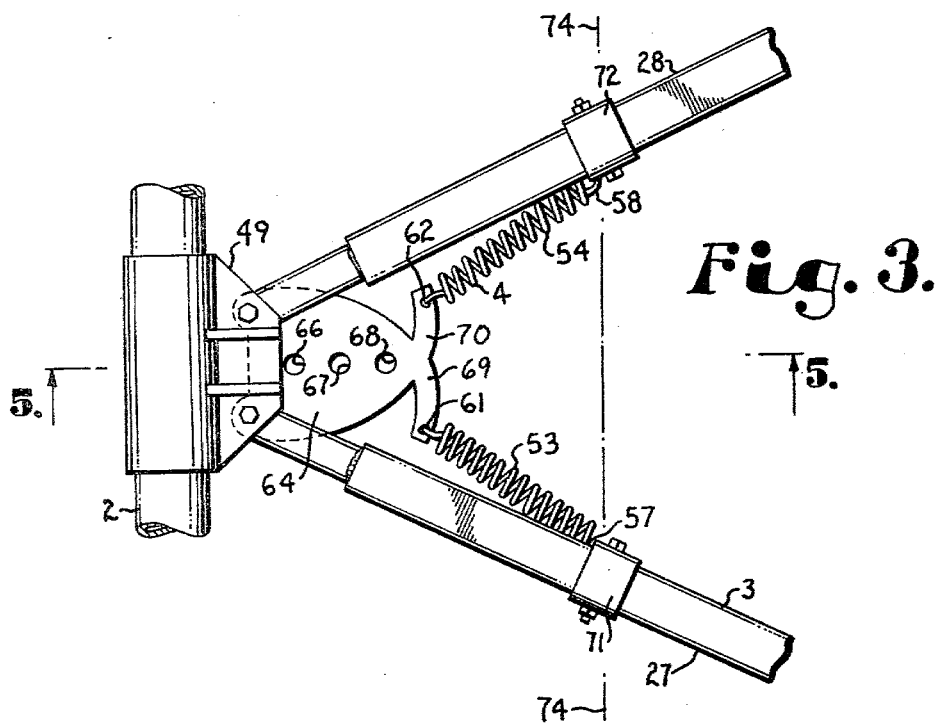
Fig. 3.
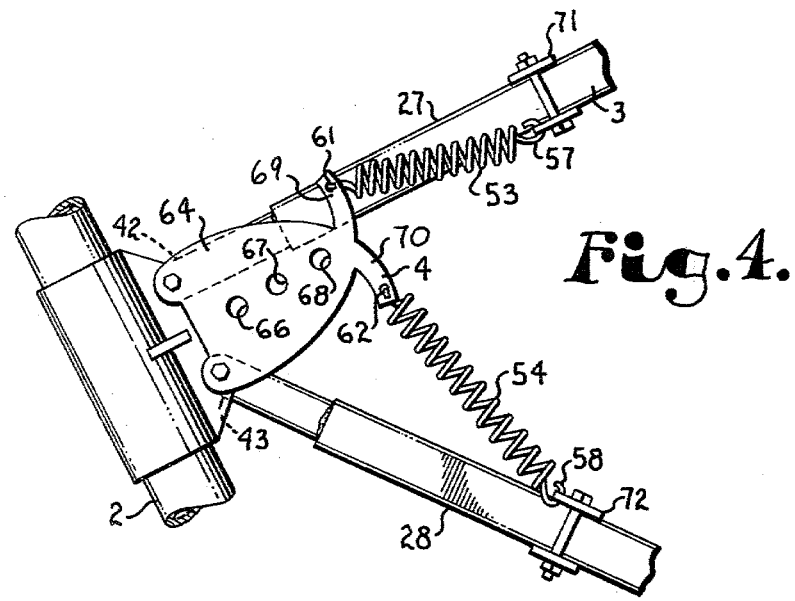
Fig. 4.
Fig. 5.
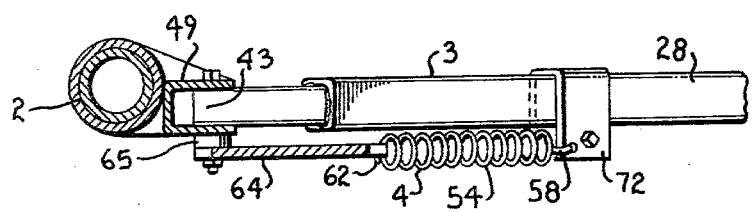

HITCH POSITIONING MECHANISM

BACKGROUND OF THE INVENTION

This invention relates to a deformable hitch with a rotatable bottom bar thereon and having a mechanism for continuously urging the bottom bar into a position parallel to the rear of a towing vehicle.

Conventional towing vehicles are frequently equipped with a vehicle towing sling assembly which includes a belt-type sling which cradles the bumper of a towed vehicle and ends in a bottom bar having J-hooks attached thereto for connection to the underside of the vehicle being towed. In addition, the bottom bar is pivotally attached to a hitch which extends rearwardly from the towing vehicle. The bottom bar must be pivotal with relationship to the hitch mechanism, so that the towed and towing vehicles may turn easily when connected together. This pivotal nature of the bottom bar presents problems to the operator of the towing vehicle. In particular, when connecting the two vehicles, if the bottom bar is not substantially parallel to the rear of the towing vehicle, there is a tendency for the outermost end thereof to jab and thereby damage the vehicle to be towed. Thus, the operator must physically get out of the towing vehicle before he can back same into position for towing and manually adjust the bottom bar. Even this is not always effective as strong winds and/or jerking motions of the towing vehicle may deflect the bottom bar out of the desired parallel position. Hence a device is desired that will allow pivotal rotation of the bottom bar but will continually urge the bottom bar to return to the desired parallel position with sufficient force to overcome wind or other extraneous causes of deflection.

Attempts have been made in the prior art to stabilize the bottom bar in the above discussed parallel alignment. Such attempts have included various combinations of hooks, individual springs, and rubber stops. However, these devices have often required some kind of manual adjustment thereof and have generally been inadequate in producing the results desired thereof.

SUMMARY OF THE INVENTION

The present invention comprises two tensile members or springs attached to the sides or arms of a hitch having a generally trapezoidal or triangular shape and having a bottom bar which is free to rotate about one end of the hitch. The springs are also connected to the bottom bar in such a manner as to urge the bottom bar into a position parallel to a rear of a vehicle upon which the hitch is mounted. In a preferred embodiment, the springs act on the bottom bar through a lever arm attached thereto and, also, are aligned such that any movement of the bottom bar out of the desired parallel position will increase the tension on both springs, whereby both positively act to return the bottom bar to the parallel position. Although urged into a parallel position, the bottom bar is still able to rotate when a towed vehicle is attached thereto.

Therefore, the principal objects of the present invention are: to provide a vehicle tow sling wherein the hold-back hitch assembly has a mechanism thereon for continuously urging the bottom bar into a position parallel with the rear of the towing vehicle; to provide such a mechanism having two tensile members both of which positively urge the bottom bar into the desired parallel position; to provide such a mechanism wherein the tension on each of the tensile members is unequal whenever the bottom bar is out of the desired parallel position and in this manner urges the bottom bar to return to the parallel position and in that position to be in a state of equilibrium; to provide such a mechanism having a lever arm attached to and outwardly extending from the bottom bar such that the tension exerted by each of the tensile members is amplified and such that the tensile members do not interfere with each other; and to provide such a mechanism which is simple, easy to use, capable of an extended useful life, and particularly well adapted for the proposed use thereof.

Other objects and advantages of this invention will become apparent from the following description taken in connection with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 3 is a top plan view of the hold-back hitch and stabilizer mechanism showing the bottom bar in the parallel position.

FIG. 4 is a fragmentary bottom plan view of the hold-back hitch and stabilizer mechanism, showing the bottom bar in a non-parallel position.

FIG. 5 is a cross-sectional view of the hold-back hitch and the stabilizer mechanism, taken along a line 5—5 of FIG. 3.

DETAILED DESCRIPTION OF THE PREFERRED EMBODIMENT

Figure 1:
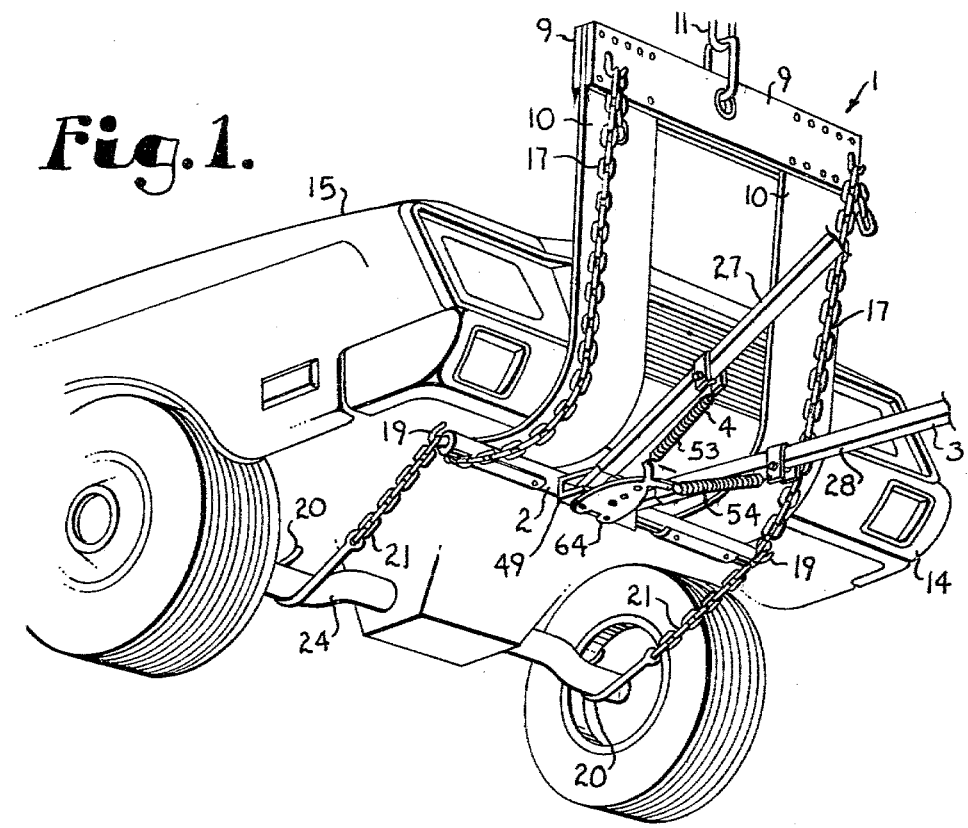
FIG. 1 is a perspective view of a vehicle being towed by a vehicle tow sling having a hold-back hitch mechanism including a pivotally connected bottom bar and a stabilizing mechanism embodying the present invention.

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis of teaching one skilled in the art to variously employ the present invention in virtually any appropriately detailed structure.

In the illustrated embodiment of the present invention, the reference numeral 1 generally designates a vehicle tow sling having a bottom bar 2 and a hold-back hitch 3. A stabilizer mechanism 4 for the bottom bar 2 is mounted on the hold-back hitch 3.

Figure 2:
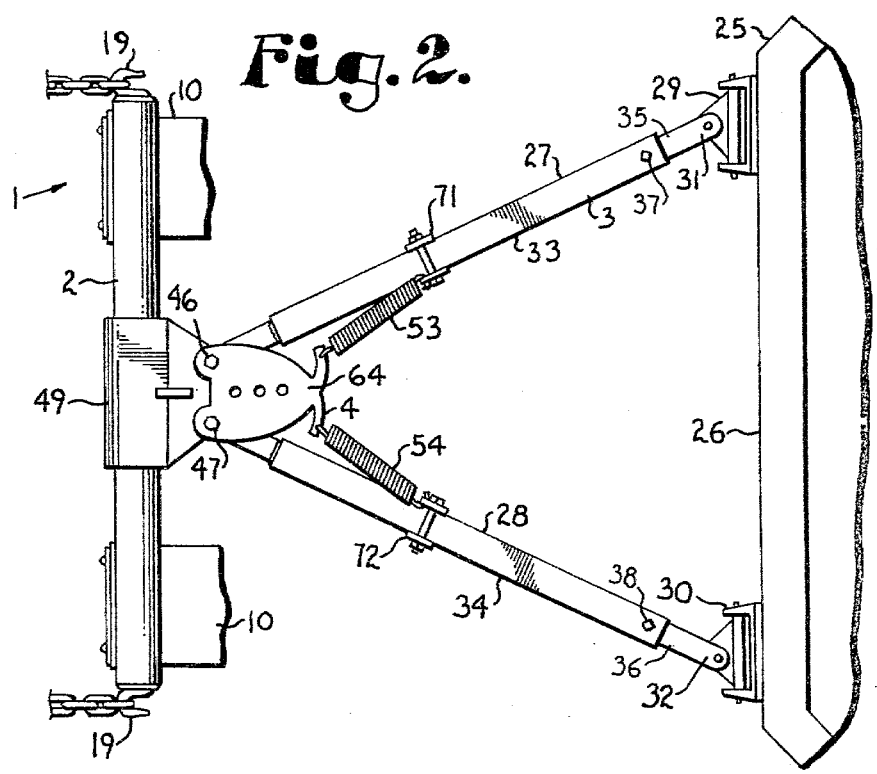
FIG. 2 is a bottom plan view of the hold-back hitch and stabilizer mechanism pivotally attached to the rear of a towing vehicle, showing the bottom bar in a position parallel to the rear of the towing vehicle.

The vehicle tow sling 1 is a common device used for towing vehicles, especially those which have been damaged or otherwise disabled. As seen in FIG. 1, the vehicle tow sling 1 has a pair of top plates 9 which are fixedly fastened together and hold downwardly extending flexible belts 10. The top plates 9 are connected by means of a chain 11 to a hoist (not shown) on a wrecker or other suitable towing vehicle. When in use, the belts 10 flexibly cradle the bumper 14 of a vehicle 15 to be or being towed. Attached to the lower ends of the belts 10 is the bottom bar or support member 2. When the tow sling 1 is connected to the towed vehicle 15, the bottom bar 2 extends generally parallel to and below the towed vehicle's bumper 14. A pair of safety chains 17 also connect the bottom bar 2 with the top plates 9. Hooking members or receivers 19 are attached to both ends of the bottom bar 2. A pair of J-hooks 20 are attached to the bottom bar hooking members 19 by means of chains 21. When in use, the J-hooks 20 encircle the axle 24 of the towed vehicle 15. The hold-back hitch 3, as best shown in FIG. 2, connects a towing vehicle 25 having a rear surface 26 to the bottom bar 2 and maintains a given distance therebetween thereby eliminating sway of the towed vehicle 15 with respect to the towing vehicle 25 and possible damage to one or both of these vehicles. The hold-back hitch 3, as illustrated, has two extensile arms 27 and 28. One end 31 and 32 of each of the extensile arms 27 and 28 is attached to the rear of the towing vehicle 26 by universal pivotal members 29 and 30 respectively. The pivotal members 29 and 30 allow both vertical and horizontal rotation of each arm 27 and 28 respectively with respect to the rear of the towing vehicle 26. Each of the arms 27 and 28, as illustrated, have an outer member 33 and 34 and an inner member 35 and 36 sleeved within the outer members 33 and 34 and positioned by set screws 37 and 38 respectively. The opposite ends 42 and 43 of the extensile arms 27 and 28 are pivotally attached by bolts 46 and 47 to a central mounting member 49 on the bottom bar 2. Each of the extensile arms 27 and 28 can be easily lengthened or shortened to allow for different shaped vehicles 15 being towed, however each of the extensile arms 27 and 28 is generally the same length when in use. The bottom bar 2 is thus pivotally allowed to rotate about the connection therewith to the extensile arms 27 and 28, such that, the towed vehicle 15 is free to turn with respect to the rear of the towing vehicle 26. However, the center of the bottom bar 2 is always substantially maintained at a desired and preset distance from the towing vehicle 26. While a particular vehicle tow sling 1 has been described and illustrated herein, many modifications thereof are possible which still are under the purview of the present invention. For example, in the illustrated embodiment the arms 27 and 28, the rear of the towing vehicle 26, and the bottom bar mounting member 49 define a quadrilateral frame structure having equal sides (the arms 27 and 28) and being pivotally connected together, so that a regular trapezoidal shape is formed thereby, as seen in FIG. 2, when the bottom bar 2 is parallel to the rear of the towing vehicle 26. It is foreseen that many variations of the hold-back hitch are possible, such as, the short base of the trapezoid (between the pivot bolts 46 and 47) and the long base of the trapezoid (between the pivotal members 29 and 30) could be reversed or the arm ends 42 and 43 may be pivotally joined at a common point on the mounting member 49, directly on the bottom bar 2, or at a point removed from but connected to the bottom bar 2. In addition, minor modifications such as use of non-extensile arms in replacement of the extensile arms 27 and 28 are also foreseen.

The stabilizer mechanism 4, in general, comprises a pair of resilient or tension means which are illustrated as tensile members 53 and 54 in the form of elongated springs. Although springs are shown in the illustrated embodiment, the use of various other types of devices for producing tension is also envisioned, such as, compression springs or hydraulic type cylinders. It is required that the tensile members 53 and 54 be attached to a medial position along the extensile arms 27 and 28 at a first end thereof respectively and that the tensile members be connected by the second end thereof to either the bottom bar 2 or the rear of the towing vehicle 26, such that equal tension exist on each tensile member 53 and 54 whenever the bottom bar 2 is parallel to the rear of the towing vehicle 26 or in other words, that the bottom bar 2 is perpendicular to the normal motion of the towing vehicle 26. In addition, if the tensile members 53 and 54 are attached directly to the bottom bar 2 they must be attached to spaced apart locations thereupon, unless the arms 27 and 28 pivotally connect to the bottom bar 2 at spaced apart locations. In a particular embodiment of the present invention, the stabilizer mechanism 4 includes a lever arm means 64, illustrated as a substantially flat heart-shaped plate. In the illustrated embodiment, the plate 64 is attached to the bottom bar mounting member 49 by the same bolts 46 and 47 which pivotally attach the arms 27 and 28 respectively thereto and being spaced apart from the mounting member 49 by circular spacers 65. The plate 64 also has three spaced apertures 66, 67 and 68 and outwardly extending tails 69 and 70.

In the preferred embodiment of the present invention, the tensile members 53 and 54 are attached at ends 57 and 58 to extensile arms 27 and 28 by clamps 71 and 72 respectively. The tensile member opposite ends 61 and 62 are attached to the plate tails 69 and 70. Preferably also, the tensile members 53 and 54 are aligned between the attachments thereof respectively to the extensile arms 27 and 28 and the pivotal bolts 47 and 46 on the opposite arms respectively, whenever the bottom bar 2 is in the position parallel to the rear of the towing vehicle 26 (which is also parallel to an imaginary line 74 between the attachment of the two tensile members 53 and 54 to the extensile arms 27 and 28 respectively), as shown in FIGS. 2 and 3. When the tensile members 53 and 54 are thus aligned, any rotation of the bottom bar 2 will cause a consequent rotation in the plate 64 and a pivoting thereof with respect to the extensile arms 27 and 28 at the pivotal bolts 46 and 47, and will also cause an elongation of the tensile members 53 and 54. Thus the tensile members 53 and 54 which are under equal tension and in a state of equilibrium when the bottom bar is in the parallel position, each have an increased tension applied thereto due to the elongation thereof whenever the bottom bar 2 moves from the parallel position. In particular, one of the tensile members 53 and 54 will elongate to a greater extent than the other tensile member and will thus have a greater tension applied thereto. This unequal tension creates a state of unequalibrium in the stabilizer mechanism and there is a tendency for the bottom bar 2 to thus be urged back into the parallel position. In this preferred embodiment it should be noted that both tensile members 53 and 54, although under unequal tension when the bottom bar 2 is in a non-parallel position, are under tension increased above their equalibrium state and thus both positively act to urge the bottom bar 2 to return to the parallel position. The tension created on each of the tensile members 53 and 54, although sufficient to urge the bottom bar 2 into the desired parallel position, is not sufficient to prevent a towed vehicle 15 from being able to pivot upon the hold-back hitch 3 about the middle of the bottom bar 2.

In use the stabilizer mechanism 4 is attached to the vehicle tow sling 1, as described above, preferably with a slight but equal pretension upon each of the tensile members 53 and 54 when the bottom bar 2 is in the above discussed parallel position. The stabilizer mechanism 4, in this manner, urges the bottom bar into a position parallel to the rear of the towing vehicle 26 and also the vehicle to be towed 15 so that the bottom bar 2 does not damage the towed vehicle 15 when connecting the two vehicles 15 and 25. In normal use no adjustment must be made to the stabilizer mechanism 4 unless the extensile arms 27 and 28 of the hold-back hitch 3 are elongated or shortened.

The stabilizer mechanism 4 may also be used in conjunction with other types of hold-back hitches, in particular such hitches in which both of the extensile arms 27 and 28 pivot at a common point in relationship to the bottom bar 2. For this type of configuration, the extensile arms 27 and 28 could pivotally attach to one of the apertures 66, 67 or 68 of the plate 64, with the remainder of the structure being as described above. It is also foreseen that the tensile members 53 and 54 may attach at common points to the plate 64 or at other points along the plate 64 than as described above, although such attachment may not be as effective in allowing both of the tensile members 53 and 54 to function as strongly as in the preferred embodiment described above. It is also foreseen that the plate 64 could substantially vary in length without greatly decreasing the effectiveness of the device, for instance, the plate 64 could even extend outwardly from the bottom bar beyond the imaginary line 74 connecting the points where the tensile members 53 and 54 attach to the extensile arms 27 and 28 respectively and, in addition, the tensile arms 53 and 54 could foreseeably also be attached at such an outward location.

It is to be understood that while certain embodiments of the present invention have been illustrated and described, this invention is not to be limited to the specific form or arrangement of parts herein described and shown.

Having thus described the invention, what is claimed and desired to secure by Letters Patent is:

1. A mechanism adapted for attachment to a hitch; and hitch characterized by having first and second arms and a support member, said support member having a pivotal attachment to each of said first and second arms near one end thereof and the opposite ends of said arms being pivotal and spaced at a fixed distance relative to each other respectively; said mechanism comprising:
    (a) first and second tension means being substantially equivalent with respect to the tension developed respectively upon elongation thereof; one end of said first and second tension means being attached medially and at an equal distance along said first and second arms respectively;
    (b) lever arm means being attached near one end thereof to and extending generally perpendicularly from said support member;
    (c) said one end of said lever arm means being attached to said support member whereat said first and second arms form said pivotal attachment to said support member respectively; and
    (d) said tension means being attached to said lever arm means at an equal distance spaced apart from said one end thereof and at laterally spaced apart locations thereon characterized by the tension in each of said tension means developing a vector force passing through said pivotal attachment to said support member of the arm opposite the arm to which said tension means is attached respectively when said support member is in said parallel position, whereby the tension in each said tension means is equal and at a minimum whenever said support means is in said parallel position thereby forming a state of equilibrium tension and the tension in both tension means are unequal whenever said support member is deflected from said parallel position thereby forming a state of equilibrium and urging said support member to return to said parallel position.

2. The apparatus according to claim 1 wherein:
    (a) said lever arm means comprises a platen, said tension are elongate springs;
    (b) each of said springs is fixedly attached to said platen on the side thereof adjacent to the arm to which said spring is medially attached when said support member is in said parallel position;
    (c) said platen is pivotally attached to each of said arms;
    (d) said support member is a elongate bar; and
    (e) the distance between where each said spring attaches to said platen and to each said arm associated respectively with said spring is at a minimum when said bar is in said parallel position; such that whenever said bar rotates out of said parallel position, the tension on both of said springs is increased, such that both of said springs positively and simultaneously urge said bar to return to said parallel position.

3. A towing apparatus adapted for use with a first vehicle being towed and a towing second vehicle; said towing apparatus comprising:
    (a) first and second arms, each being adapted at one end thereof for pivotal connection with said towing second vehicle;
    (b) an elongate support member adapted for connection to said towed first vehicle; said member being pivotally connected to the opposite ends of each of said first and second arms, such that said member is horizontally pivotal with respect to such towing apparatus;
    (c) first and second tensile members, each being attached at one end thereof to a medial position along said first and second arms respectively;
    (d) a lever arm member being fixedly attached at one end thereof to and extending outwardly in the general direction of said second vehicle from said support member;
    (e) an opposite end of each said tensile member is attached to said lever arm member; and arm member; and
    (f) each of said first and second arms are pivotally attached to both said support member and said lever arm member at positions spaced apart along said support member.

4. The apparatus according to claim 3 wherein:
    (a) each said tensile member is substantially aligned between the attachment thereof to the arm associated therewith and the attachment of the opposite arm with said support member and have equal tension thereon, when said support member is in said perpendicular position, such that, tension is increased on both of said tensile members whenever said support member is not in said perpendicular position, whereby both tensile members simultaneously urge said support member to return to said perpendicular position.

5. The apparatus according to claim 4 wherein:
(a) each said tensile member is an elongate spring;
(b) each said spring is attached to said lever member at spaced apart locations thereon; and
(c) said support member is an elongate bar.

6. A towing apparatus adapted for use with a first vehicle being towed and a towing second vehicle; said towing apparatus comprising:
(a) first and second arms, each being adapted at one end thereof for pivotal connection with said towing second vehicle;
(b) an elongate support member adapted for connection to said towed first vehicle; said member being pivotally connected to the opposite ends of each of said first and second arms, such that said member is horizontally pivotal with respect to such towing apparatus;
(c) first and second tensile members, each being attached at one end thereof to a medial position along said first and second arms respectively;
(d) a lever arm member being fixedly attached at one end thereof to and extending outwardly in the general direction of said second vehicle from said support member;
(e) an opposite end of each said tensile member is attached to said lever arm member; and
(f) each of said first and second arms are pivotally attached to said lever arm member at a common location thereon.

* * * * *